(12) United States Patent
Radulescu

(10) Patent No.: US 8,014,401 B2
(45) Date of Patent: Sep. 6, 2011

(54) ELECTRONIC DEVICE AND METHOD OF COMMUNICATION RESOURCE ALLOCATION

(75) Inventor: Andrei Radulescu, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 753 days.

(21) Appl. No.: 11/915,746

(22) PCT Filed: Jun. 2, 2006

(86) PCT No.: PCT/IB2006/051776
§ 371 (c)(1), (2), (4) Date: Nov. 28, 2007

(87) PCT Pub. No.: WO2006/129294
PCT Pub. Date: Dec. 7, 2006

(65) Prior Publication Data
US 2009/0016338 A1 Jan. 15, 2009

(30) Foreign Application Priority Data
Jun. 3, 2005 (EP) .................. 05300450

(51) Int. Cl.
*H04L 12/28* (2006.01)

(52) U.S. Cl. ........ 370/392; 370/235; 370/256; 370/389; 370/458

(58) Field of Classification Search .......... 370/458, 370/389, 498, 348, 322, 392, 471, 391, 235, 370/256
See application file for complete search history.

(56) References Cited

U.S. PATENT DOCUMENTS

| | | | |
|---|---|---|---|
| 5,526,344 A | | 6/1996 | Diaz et al. |
| 5,737,628 A | * | 4/1998 | Birrittella et al. ............... 712/11 |
| 6,151,318 A | * | 11/2000 | Woodward et al. ........... 370/392 |
| 7,486,685 B2 | * | 2/2009 | Rankin et al. .................. 370/412 |
| 7,613,183 B1 | * | 11/2009 | Brewer et al. .................. 370/392 |

(Continued)

FOREIGN PATENT DOCUMENTS
EP 0734195 A2 9/1996

OTHER PUBLICATIONS

Dieliseen et al. ("Concepts and Implemenation of the Philips Network-on-Chip"); 2003; pp. 1-6.*

(Continued)

*Primary Examiner* — Ricky Ngo
*Assistant Examiner* — Dewanda Samuel

(57) ABSTRACT

An electronic device is provided comprising an interconnect means (N, sw0-sw2) for connecting a plurality of modules (IP); and at least one network interface (NI) for coupling at least one of the plurality of modules (IP) to the interconnect means (N; sw0-sw2) and for packetizing data from the modules (IP) into first packets (pck). The communication over the interconnect (N; sw0-sw2) is based on time slots, wherein a second packet (μpck) is transferred during one time slot. A data traffic over the interconnect means (N; sw0-sw2) comprises at least one guaranteed service traffic class (GS) and/or at least one best-effort service traffic class (BE). First packets (GSpck) relating to the at least one guaranteed service traffic class (GS) are transferred in second packets (μpck) within time slots reserved for the guaranteed service traffic class (GS). First packets (pck1-pck6) relating to the at least one best-effort service traffic class (BE) are transferred within unreserved second packets (μpck) and/or within unused portions (uu) of the second packets (μpck).

8 Claims, 6 Drawing Sheets

U.S. PATENT DOCUMENTS

2002/0085565 A1 7/2002 Ku et al.
2002/0126657 A1 9/2002 Frouin et al.
2003/0058869 A1* 3/2003 Novick .................... 370/395.43

OTHER PUBLICATIONS

Rijipkema et al. ( "A Router archictecture for Neworks on Silcon"), 2001; pp. 1-8.*

Radulsecu et al. (" An Efficient On-chip NI Offering Guranteed services, Shared Memory abstraction, and Flexibel Network Configuration"); 2003; IEE; pp. 1-14.*

Rijpkema et al. ( "Trade Offs in Designs of Router with both Guranteed and best-Effort Service for Network on Chip"); pp. 1-6.*

Rijpkema et al. ; ( "A router Archiyecture for Network on Silicon") 2001; pp. 1-8.*

Rijpkema et al. ( "Trade Offs in Designs of Router with both Guranteed and best-Effort Service for Network on Chip") 2003; pp. 1-6.*

Rijpkema et al: "Trade-Offs in the Design of a Router With Both Guaranteed and Best-Effort Services for Networks on Chip", IEEE Proc. Comput. Digit. Tech. vol. 150, No. 5, Sep. 2003.

* cited by examiner

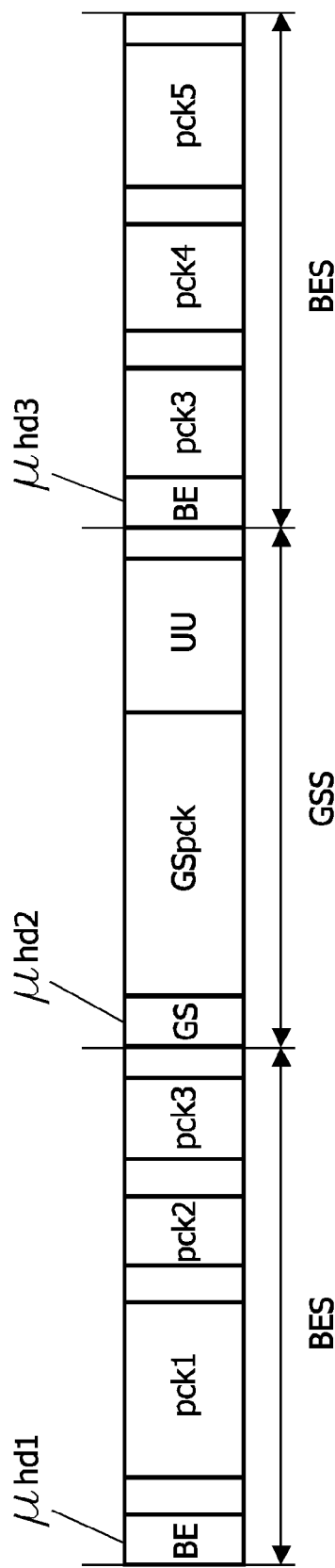
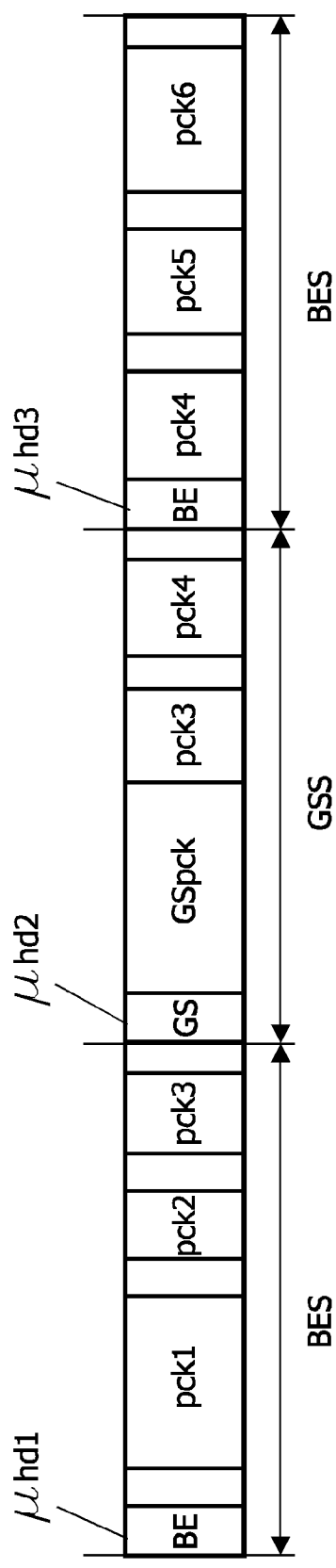
FIG. 5
FIG. 6

ELECTRONIC DEVICE AND METHOD OF COMMUNICATION RESOURCE ALLOCATION

FIELD OF THE INVENTION

The invention relates to an electronic device, a mobile device, and a method of communication resource allocation.

BACKGROUND OF THE INVENTION

Current mobile systems, such as a mobile phone or a PDA, show a continuous increase in complexity due to the ever increasing need for implementing new features and improvements of existing functions. This is enabled by the increasing number and complexity of the components of a system. At the same time the data rates at which these components communicate increases too. The higher data rates in combination with the increased system complexity has created the need for a modular approach. According to such an approach the processing system comprises a plurality of relatively independent, complex modules.

In conventional mobile systems, the modules usually communicate to each other via a expensive parallel dedicated links. As the number of modules increases however, this way of communication is no longer practical for the following reasons. First, increased number of links are too costly. Second, using dedicated links limits the flexibility of quickly creating new system configurations.

A communication network using serial links forms an effective way to overcome these disadvantages. Networks have received considerable attention recently as a solution to the interconnect problem in highly-complex mobile systems (e.g., the UniPro Working Group is currently defining a network protocol for mobile devices in the MIPI standardization body; for more information please refer to www.mipi.org). The reason is twofold. First, the network links are serial, which considerably reduces the number of pins/wires for a links, thus, considerably reduces the interconnect cost. Second, networks offer flexibility in the way modules are interconnected, allowing quick and easy creation of new configurations.

Introducing network interconnects radically changes the communication when compared to direct connections. This is because of the multi-hop nature of a network, where communication modules are not directly connected, but are remotely separated by one or more network nodes. The communication control, which in a standard mobile phone is controlled by the application processor, becomes a network task, and is distributed across network nodes. Moreover, new issues must be addressed, such as data ordering and flow control, either in specialized proprietary modules, or in the network itself.

A network typically consists of a plurality of routers and network interfaces. Routers serve as network nodes and are used to transport data from a source network interface to a destination network interface by routing data on a correct path to the destination on a static basis (i.e., route is predetermined and does not change), or on a dynamic basis (i.e., route can change depending e.g., on the load to avoid hot spots). Routers can also implement time guarantees (e.g., rate-based, deadline-based, or using pipelined circuits in a TDMA fashion). For more information, please refer to "Trade-offs in the design of a router with both guaranteed and best-effort services for networks on chip; by Rijpkema et al., in IEE Proc.-Comput. Digit. Tech. Vol. 150, Nr. 5, September 2003, which is incorporated herein by reference.

The network interfaces are connected to a module, which may represent any kind of data processing unit, a display, a camera, a memory, etc. In particular, the network interfaces constitute a communication interface between the modules and the network. The network interfaces are designed to handle data sequentialisation (fitting the data offered by the module to the serial links) and packetization (adding the packet headers and trailers needed internally by the network). The network interfaces may also implement packet scheduling, which can include timing guarantees and admission control.

A cost-effective way of providing time-related guarantees (i.e., throughput, latency and jitter) is to use pipelined circuits in a TDMA (Time Division Multiple Access) fashion, which is advantageous as it requires less buffer space compared to other schemes, such as rate-based or deadline-based. Using TDMA, the available time and therefore the bandwidth is divided in time slots of equal size, which may be reserved to data streams. For each link a slot table may be provided. The reservation of slots ensures that data streams with real-time constrains can comply to their timing requirement. In other words, those data streams with reservation in the slot table are guaranteed a minimum bandwidth and an upper bound of latency, i.e. guaranteed service GS data. Those data without slot reservations are referred to as best-effort BE data. The best-effort BE data is transferred in slots which are not reserved or reserved but not used, i.e. if a slot is not reserved or a slot is reserved but not used, then the slot is used to transfer best-effort BE data. So a slot is used either to transfer guaranteed data or best-effort data.

At each slot, a data item is moved from one network component to the next one, i.e. between routers or between a router and a network interface. Therefore, when a slot is reserved at an output port, the next slot must be reserved on the following output port along the path between an master and a slave module, and so on.

The data which can be transferred during a time slot can be referred to as a packet. The data packet typically consists of a payload, i.e. the actual data which is to be sent over the network. Optionally, a header can be provided which may comprise information relating to the payload length, the sequence number of the payload, whether it is a best-effort BE or guaranteed GS connection etc. Furthermore, optionally a trailer can be provided at a CRC check. However, the header and the trailer are merely optional.

The routing of the data can be performed by using a header containing an address or a sequence of output ports which are to be used to route the packets through the network. If the data packets relate to a guaranteed throughput connection, the routing information can also be stored in slot tables arranged in the network interfaces and/or the routers.

As the packet length of the modules do not necessarily correspond to the packet length of the communication of a network, data messages from the modules may be embedded in one slot or may span over multiple slots. However, a packet will always start at the beginning of a time slot. This is in particular advantageous as very simple state machines for checking the packet headers can be provided. State machines checking the packet headers can be used to set the switches to move the data to a correct output port. Once the switch is set, all data contained in a particular slot is transferred to the same output port.

To optimize for low latency, the time slots are made as small as possible. However, especially in off-chip networks (communication between multiple chips in an electronic device) using serial links, the time slots may have larger size (e.g., 128 bytes) to reduce the header/trailer overhead, and to reduce power consumption. In order to optimize the power dissipation, larger data amounts are transferred at once to allow any link to stay in a standby or sleep mode for a longer period of time. On the other hand, larger slots will result in larger latencies and larger buffers.

SUMMARY OF THE INVENTION

It is an object of the invention to provide an electronic device and a method of communication resource allocation with an improved allocation of communication resources.

This object is solved by an electronic device according to claim 1, by a mobile device according to claim 8 and a method of communication resource allocation according to claim 9.

An electronic device is provided comprising an interconnect means for connecting a plurality of modules, and at least one network interface for coupling at least one of the plurality of modules to the interconnect means and for packetizing data from the modules into first packets. The communication over the interconnect is based on time slots, wherein a second packet is transferred during one time slot. A data traffic over the interconnect means comprises at least one guaranteed service traffic class and/or at least one best-effort service traffic class. First packets relating to the at least one guaranteed service traffic class are transferred in second packets within time slots reserved for the guaranteed service traffic class. First packets relating to the at least one best-effort service traffic class are transferred within unreserved second packets and/or within unused portions of the second packets.

Therefore, the interconnect is used more efficiently, as the data relating to best-effort services is transferred as soon as possible, i.e. also in unused space within packets reserved for guaranteed service traffic, improving the latency of best-effort packets. Furthermore, more than one GS traffic class and/or more than one BE traffic class may be provided.

According to an aspect of the invention at least one packet relating to the best-effort service traffic class is transferred within at least one second packet, such that a best-effort packet may start and end at any place within a second packet, i.e. a micro packet.

According to an aspect of the invention the first packets relating to the at least one guaranteed service traffic class are aligned to a beginning or an end of a second packet. This will lead to a simpler state machine for detecting a guaranteed service traffic packet.

According to an aspect of the invention an extra header is introduced to a first packet relating to the at least one best-effort service traffic class, if not all of the first packet is transferred within one second packet, such that it is ensured that all of the data of a best-effort packet, which stretch over several second packets, will arrive at its destination.

According to a further aspect of the invention the interconnect means comprises at least one router for routing the second packets through the interconnect means. At least one router and the at least one network interface are coupled providing links for transferring second packets. The second packets form link-level data units.

According to still a further aspect of the invention, the device comprises at least one header parsing unit for parsing the second packets. The header parsing unit is active for every word of the second packets to be able to detect the beginning of a best-effort packet.

The invention also relates to a mobile device which comprises an interconnect means for connecting a plurality of modules; and at least one network interface for coupling at least one of the plurality of modules to the interconnect means and for packetizing data from the modules into first packets.

The communication over the interconnect is based on time slots, wherein a second packet is transferred during one time slot. A data traffic over the interconnect means comprises at least one guaranteed service traffic class and/or at least one best-effort service traffic class. First packets relating to the at least one guaranteed service traffic class are transferred in second packets within time slots reserved for the guaranteed service traffic class. First packets relating to the at least one best-effort service traffic class are transferred within unreserved second packets and/or within unused portions of the second packets.

The invention further relates to a method of communication resource allocation within an electronic device having an interconnect means for connecting a plurality of modules, and at least one network interface for coupling at least one of the plurality of modules to the interconnect means and for packetizing data from the modules into first packets, wherein a data traffic over the interconnect means comprises at least one guaranteed service traffic class and/or at least one best-effort service traffic class. The communication over the interconnect is based on time slots, wherein a second packet is transferred during one time slot. The first packets relating to the at least one guaranteed service traffic class are transferred in second packets within time slots reserved for the guaranteed service traffic class. First packets relating to the at least one best-effort service traffic class are transferred within unreserved second packets and/or within unused portions of the second packets.

The invention relates to the idea that larger time slots may be acceptable while longer latencies are critical for some best effort traffic, like cache updates, interrupts or control traffic class. As the best effort traffic class, which typically comprises a smaller packet sizes, can only be transferred within a time slot, the time slots are not efficiently used. To improve this best-effort packets are sent as soon as possible, i.e. as soon as a link is available, irrespective if the available space is within a GT slot or a BE slot. Therefore, multiple best-effort packets can be embedded into a single time slot such that the network efficiency can be improved for those networks which relate to large time slots as for inter-chip communications. Furthermore, the latency of the best-effort packets can be improved as the data is sent faster to its destination. The packets with the best effort data are not aligned with regard to the packets. A best-effort can therefore start and end at any place within a packet.

Other aspects of the invention are defined in the dependent claims.

BRIEF DESCRIPTION OF THE DRAWINGS

The invention is now described in more detail with reference to the drawings.

FIG. 5 shows a basic representation of three time slots according to the first embodiment, FIG. 6 shows a representation of three time slots according to the first embodiment.

DESCRIPTION OF PREFERRED EMBODIMENTS

The first embodiment relates to multi-module electronic systems, i.e. a plurality of modules on the same die, multiple dies (e.g. system in a package), or on multiple chips, which communicate with each other via some kind of interconnect. The interconnect can be embodied as a network. The network may include wires, bus, time-division multiplexing, switch, and/or routers within a network. At the transport layer of said network, the communication between the modules is performed over connections. A connection is considered as a set of channels, each having a set of connection properties, between a first module and at least one second module. For a connection between a first module and a single second module, the connection may comprise two channels, namely one from the first module to the second module, i.e. the request channel, and a second channel from the second to the first module, i.e. the response channel. Therefore, a connection or the path of the connection through the network, i.e. the connection path comprises at least one channel. In other words, a channel corresponds to the connection path of the connection if only one channel is used. If two channels are used as mentioned above, one channel will provide the connection path e.g. from the master (source device) to the slave (destination device), while the second channel will provide the connection path from the slave to the master. Accordingly, for a typical connection, the connection path will comprise two channels. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
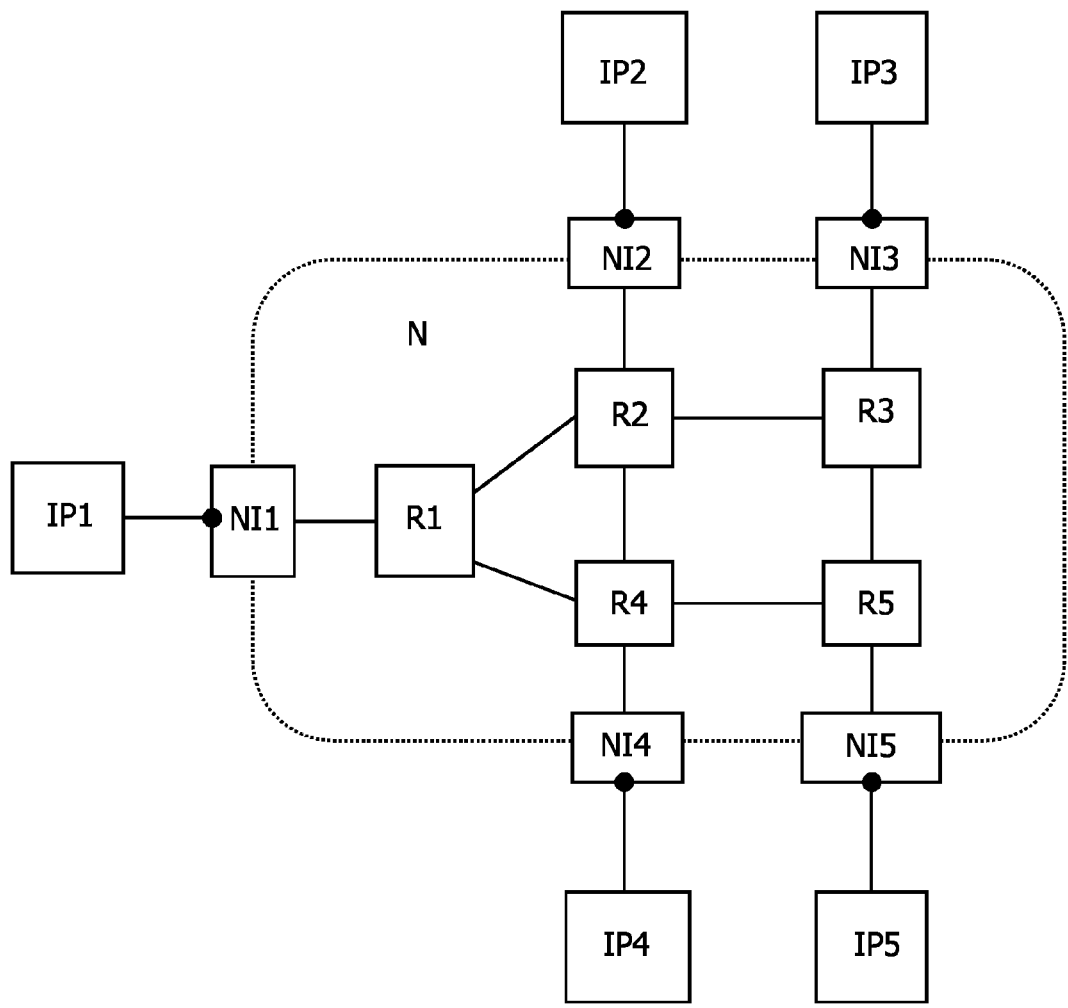
FIG. 1 shows a block diagram of the basic structure of a network on chip according to the invention.

FIG. 1 shows a block diagram of a general architecture of a network according to the present invention. The system comprises several (processing) modules or devices IP1-IP5, like computation elements, memories, a subsystem which may internally contain interconnect modules, or an interface to an external device or a further module or device. These devices or modules may be implemented as intellectual property blocks IPs. The modules or devices IP1-IP5 are each connected to a network N via a network interface NI, respectively. The network N comprises a plurality of routers R1-R5, which are connected to adjacent routers via respective network links.

The network interfaces NI1-NI5 are used as interfaces between the module or device IP1-IP5 and the network N. The network interfaces NI1-NI5 are provided to manage the communication of the respective module or device IP1-IP5 and the network N, so that the module or device IP1-IP5 can perform their dedicated operation without having to deal with the communication with the network N or other module or device. The communication (e.g. in a mobile phone) can be based on sources and destinations for a data stream (e.g., a display driver to a display, or a camera to a memory), and/or based on a server-client relationships (e.g., as in the internet).

Figure 2:
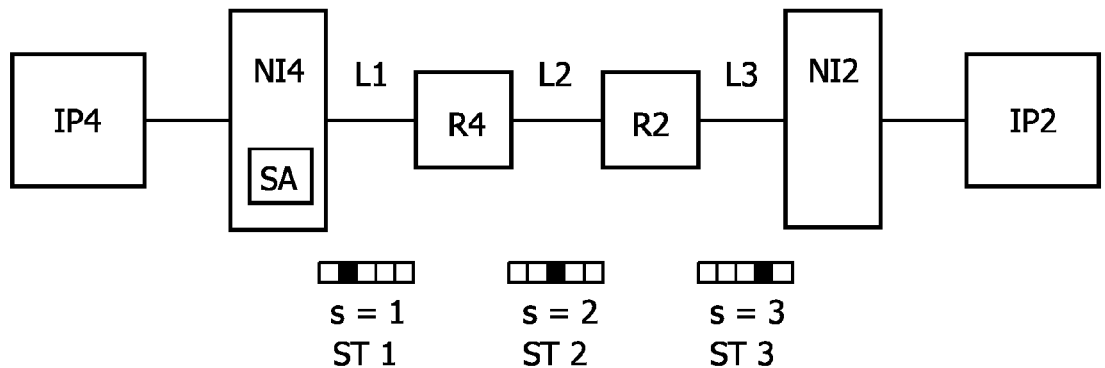
FIG. 2 shows a block diagram of a basic slot allocation for a connection in a network according to FIG. 1.

FIG. 2 shows a block diagram of a connection and a basic slot allocation in a network on chip according to FIG. 1. In particular, the connection between the module or device IP4 and IP2 is shown. This connection is realized by a network interface NI4 associated to the module or device IP4, two routers R4, R2, and a network interface N12 associated to the module or device IP2. The network interface N14 comprises a time slot allocation unit SA. Alternatively, the network interface N12, and routers R2 and R4 may also comprise a time slot allocation unit SA. A first link L1 is present between the network interface N14 and a router R4, a second link L2 is present between the two routers R4, R2, and a third link L3 is present between the router R2 and the network interface N12. Three slot tables ST1-ST3 for the output ports of the respective network components are also shown. These slot tables are preferably implemented on the output side, i.e. the data producing side, of the network elements like network interfaces and routers. For each requested slot, one slot is reserved in each slot table of the links along the connection path. All these slots must be free, i.e., not reserved by other channels. Since the data advance from one network component to another each slot, starting from slot s=1, the next slot along the connection must be reserved at slot s=2 and then at slot s=3.

The inputs for the slot allocation determination performed by the time slot allocation unit SA are the network topology, like network components, with their interconnection, and the slot table size, and the connection set. For every connection, its paths and its bandwidth, latency, jitter, and/or slot requirements are given. Each of these connections is assigned an individual path, and may comprise different links having different bandwidth, latency, jitter, and/or slot requirements. To provide time related guarantees, slots must be reserved for the links. Different slots can be reserved for different connections by means of TDMA. Data for a connection is then transferred over consecutive links along the connection in consecutive slots.

Figure 3:
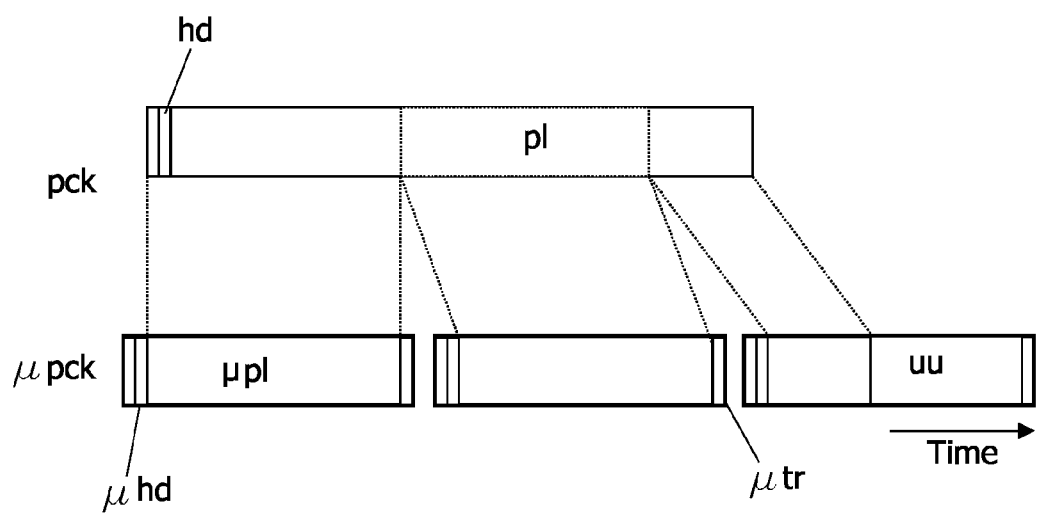
FIG. 3 shows a basic representation of the packet based communication according to a first embodiment.

FIG. 3 shows a basic representation of the packet-based communication according to the first embodiment. A packet pck is used to carry or transfer data from a source to a destination device. The packet pck typically comprises a packet header hd and a payload pl. It should be noted that the data produced by the source device or source module does not necessarily have to fit the size of the packets pck. The packets are merely a form of transferring the produced data from a source device. The data produced by the devices or module is buffered in a network adapter or network interface as in the example of FIG. 1. In the network interface, a header and possibly a tail are added to form a packet. The header may contain a destination address, a sequence number, etc. In other words, the data produced by the devices or modules is formed into a packet pck by adding a header hd and optionally a tail tr. The data produced by the devices or modules constitute the payload pl of the packet pck. Thereafter, the data produced by the devices or modules is transferred over an interconnect to a destination device or destination module or device. However, as the length of the packets pck do not necessarily match the length of data used for bandwidth reservation (slots) (the network N of FIG. 1) a further second packet form is used. These packets may be referred to as micro packets μpck. They correspond to the amount of data which can be transferred during one time slot. The structure of the second packets, i.e. the micro packets, can be optimized according to the communication resources of the interconnect. Furthermore, it should be noted that no alignment between the data from the device and the packets pck is required A packet pck of an module or device IP does not necessarily match the exact multiple of a micro packet μpck such that part of the micro packet payload may remain unused.

A micro packet represents a link-level unit of transmission and constitutes a data unit for bandwidth reservation. A micro packet is of constant size. The micro packet typically comprises 128 bytes, 1024 bits, a payload and several bytes as header/trailer. The control for the transmission of the data is included in the packet as a physical transmission medium may only consist of one serial link. If the micro packets become larger, the overhead of the header/tailor is reduced. If a larger granularity unit of transmission (i.e. a micro packet) is used, the power dissipation is reduced. This can be achieved as the data to be transferred is grouped into larger chunks such that the link has to be activated from a sleeping mode less often. Accordingly, less power is required for the activation of the links. It is better to activate the link less often by transferring longer data bursts.

Figure 4:
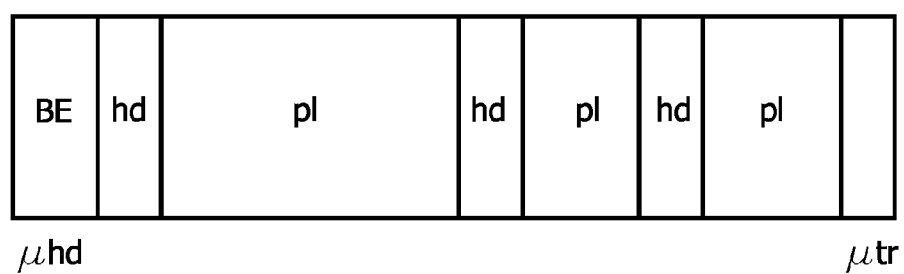
FIG. 4 shows a detailed representation of a micro packet according to the first embodiment.

FIG. 4 shows a detailed representation of a micro packet μpck according to the first embodiment. Here, a micro packet with best effort BE data is shown. In this particular example, the best effort packets are smaller than the micro packets such that several packets can be included into one micro packet. The micro packet may comprise a micro packet header μhd, while the packets may comprise a packet header hd and a packet payload pl. The micro packet may additionally comprise a micro packet tail μtr. In the representation of FIG. 4, it is shown that the best effort packets do not necessarily align with the beginning of a micro packet. The best effort packet may start and end at any place in a micro packet. The best effort packet may fit into a single micro packet or may span over multiple micro packets.

FIG. 5 shows a basic representation of three slots, comprising best effort BE data or guaranteed GS data. Accordingly, the first slot refers to a best effort slot BES, the second slot refers to a GS slot GSS and the third slot refers to a best effort slot BES. The headers μhd1, μhd2, μhd3 indicate—among others—whether GS or BE data is transferred during the slot. In the first slot being a BE slot BES, three packets of best effort data pck1-pck3 is transferred during this slot BES. In the second slot GSS, a GS packet GSpck is transferred. As this GS packet GSpck is smaller than the payload of the micro packet μpck, some of the payload of the micro packet μpck will be unused uu. In the third micro packet μpck, the rest of the third packet pck3 and the fourth and fifth packet pck4, pck5 are transferred. In this situation, handling of the GS data is not changed. The handling of the best effort packet is however changed to allow an unaligned transfer of BE packets. In other words, the third packet is transferred as soon as there is space available in one of the micro packets. Here, the space is available in the first best effort slot. As the third packet is, however, larger than the available space in the best effort slot, a part of the third packet pck3 is transferred in the third slot.

FIG. 6 shows a representation of three time slots. While in the representation of FIG. 5, the best effort data is only introduced into those slots which are not occupied by the guaranteed service traffic GS, the previously unused uu space in the GS time slot is now occupied by best effort data, i.e. packet pck3_pck4. The structure of the first best effort slot is not changed with regard to FIG. 5. The previously unused space uu is now being occupied by the second part of the third packet pck3 and a first part of the fourth packet pck4. The third time slot is now used for the same part of the fourth packet pck4, the fifth and sixth packet pck5, pck6. It is immediately apparent that more data can be transferred according to the representation of FIG. 6 than according to the representation of FIG. 5, as now the previously unused space in the GS slot is now used for best effort data. The best effort packets do not have any constraints regarding the alignment to the start of the micro packets or to the GS data.

Figure 7:
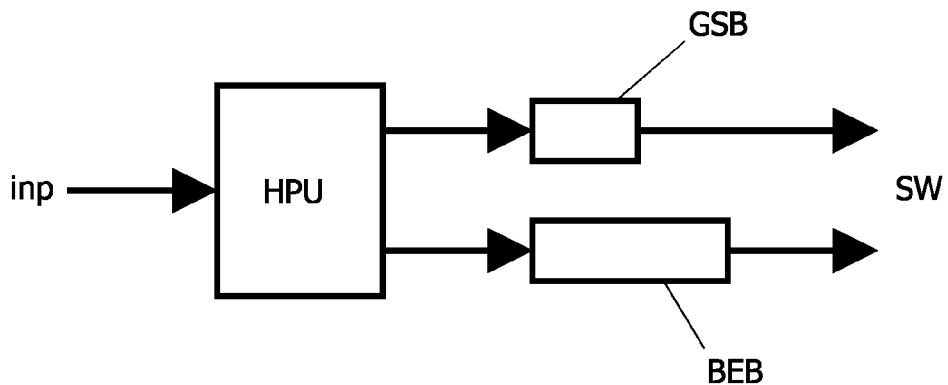
FIG. 7 shows a basic block diagram of an inteut port according to the first embodiment.

FIG. 7 shows a basic block diagram of an input port inp according to the first embodiment. Such an input port inp may be arranged at the input side of a router or a network interface. When a new packet arrives at the input port inp, a decision has to be taken on the type of the micro packet to decide in which queue the incoming data will be stored. Therefore, the input port inp is associated to a header parsing unit HPU. This header parsing unit HPU maintains a state machine for monitoring the boundaries of the GS data packets and the best effort packet boundaries. The decision to which output port the input port is to be switched is taken based on routing information like the address or the path as stored in the packet header. The best effort packets are only allowed to switch to the output ports as long as the GS data is not hindered or influenced. In other words, a best effort packet may only be switched to the output port when the input as well as the output ports are not used by GS data.

The header parsing unit HPU is connected to a separate buffer GSB for GS data and a separate buffer BEB for BE data. The GS data may be transferred according to the slot reservations in the slot table. The best effort data is transferred when the GS traffic does not use the links or switches. The header parsing unit HPU monitors the micro packet headers μhd to separate the GS data and the BE data and to forward them into the corresponding buffers or queues GSB, BEB. The header parsing unit HPU monitors the type of the micro packet μpck. If the micro packet μpck is of a GS type, the following payload relates to a GS data stream. The number of the GS words in the payload may be presented by a GS length field being part of the micro packet header μhd. If the GS length is less than the length of the micro packet payload, then there is unused space in the payload of the micro packet which may be used by best effort packets.

Figure 8:
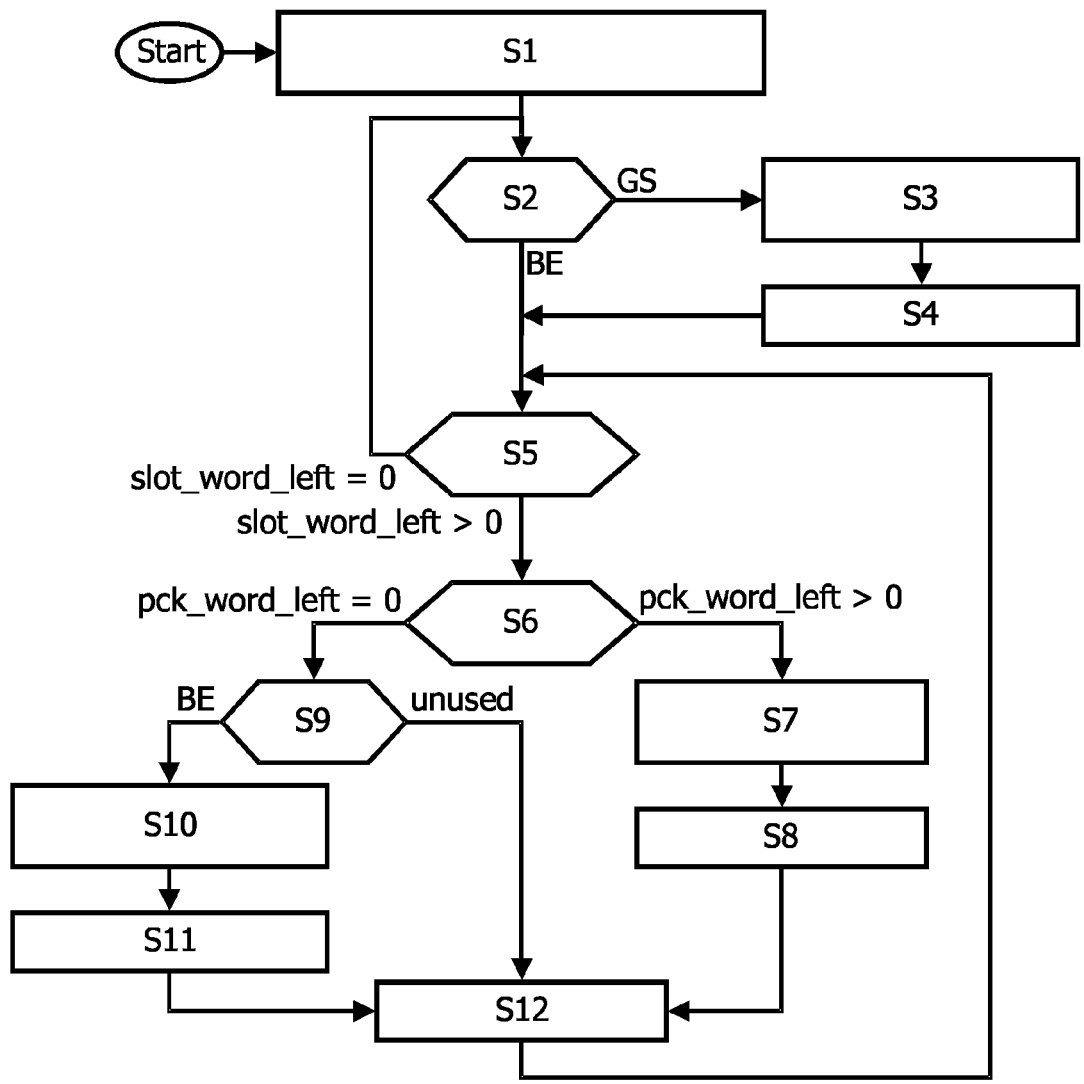
FIG. 8 shows a representation of a state machine of a header-parsing unit of FIG. 7.

FIG. 8 shows a representation of the state machine of the header parsing unit. As more than one best effort packet can be transferred during a micro packet μpck the state machine of the header parsing unit HPU must be active not only at the beginning of a micro packet μpck, but also within the micro packet μpck in order to detect a new best effort packet. For example, in the situation described according to FIG. 6, three best effort packets pck1-pck3 start during the first best effort slot BES.

In step S1, the number of words left in the slot slot_word_left is set to the length of the payload PAYLOAD_LENGTH (the micro-packet length of e.g., 128 bytes) and the numbers of the left packet word pck_word_left left in the packet is set to zero. In step S2, the type of the micro packet μpck is determined. If the micro packet μpck relates to GS traffic, the flow continues to step S3, where a number of GS words is transferred into the buffer GSB for the GS data. In step S4, the number of GS words transferred to the buffer GSB is substracted from the left slot words slot_word_left and the flow jumps to step S5.

If the type of the micro packet μpck is related to a best effort BE traffic, the flow continues to step S5. Here, the number of words left in the slots slot_word_left is determined. If the number of slot_word_left equals zero, the flow jumps to step S2. However, if the slot_word_left is larger than zero, then the flow jumps to step S6. Here, the number of words left in the packet pck_word_left is determined. If the numbers of words left in the packet pck_word_left is larger than zero, then the flow continues to step S7. Here, a word is transferred into the best effort buffer BEB. Then the flow continues to step S8 where the number of words left in the packet pck_left is decreased. The flow continues at step S12. However, if in step S6 it is determined that the number of words left in the packet pck_word_left is zero, then the flow continues at step S9, where the packet type is determined. If the packet is not used, the flow continues to step S12. However, if the packet relates to a best effort packet, the flow continues at step 10, where the word is transferred into the BE buffer BEB and the flow continues to step S11. Here, the pck_word_left is set to the length of the packet pck_length. At step S12, slot_word_left is decremented.

In other words, there is still space left for a best effort packet in the micro packet μpck if the numbers of words left in the slots slot_word_left is greater than zero. This may occur when (a) the type of the micro packet is a BE and (b) the micro packet is of a GS type but this micro packet μpck has only been partly filled with GS data such that there is still room left in the micro packet μpck. In such a case, the state machine monitors whether a packet boundary is present, i.e. the words left in the packet pck_word_left equals zero, or whether there is an ongoing packet, i.e. pck_word_left>0. If a data word is transferred to the best effort buffer BEB, the packet and the micro packet states are updated in the counters pck_word_left and slot_word_left.

If a packet is finished, i.e. pck_word_left=0, a new packet can start, wherein the packet type should be a best effort or no data is transmitted when the packet type is unused. If a new packet is started, the data is transferred into the BE buffer BEB and the packet length is saved in order to maintain the state of the packet. If the packet type is BE or unused, the slot state is updated such that it can be determined whether one or more words of the micro packet have been transferred.

Instead of using the packet length to maintain the packet state, any other alternative scheme to maintain the packet state may be used. One example is the 8b10b encoding which is used on serial lines like a PCI Express protocol. In such a case, the start of packet and/or end of packet states may be encoded for signaling the packet boundaries. If a network comprises separated control lines, the start of packet and/or end of packet may be signaled on these control lines.

It should be noted also that in the state machine described in FIG. 8, the GS data is aligned at the beginning of the micro packet. An alternative is to align the GS data at the end of the micro packet to decrease the latency of the BE packets. Placing the GS data in a block at an arbitrary position in the micro packet is also possible, however more information is then needed: e.g., in the micro packet header an offset of the GS data block needs to be specified in addition to its length. It is also possible to arbitrarily spread the GS data in the micro packet, however this would require more complex state machines and more overhead in the protocol to specify where the GS data occurs.

Figure 9:
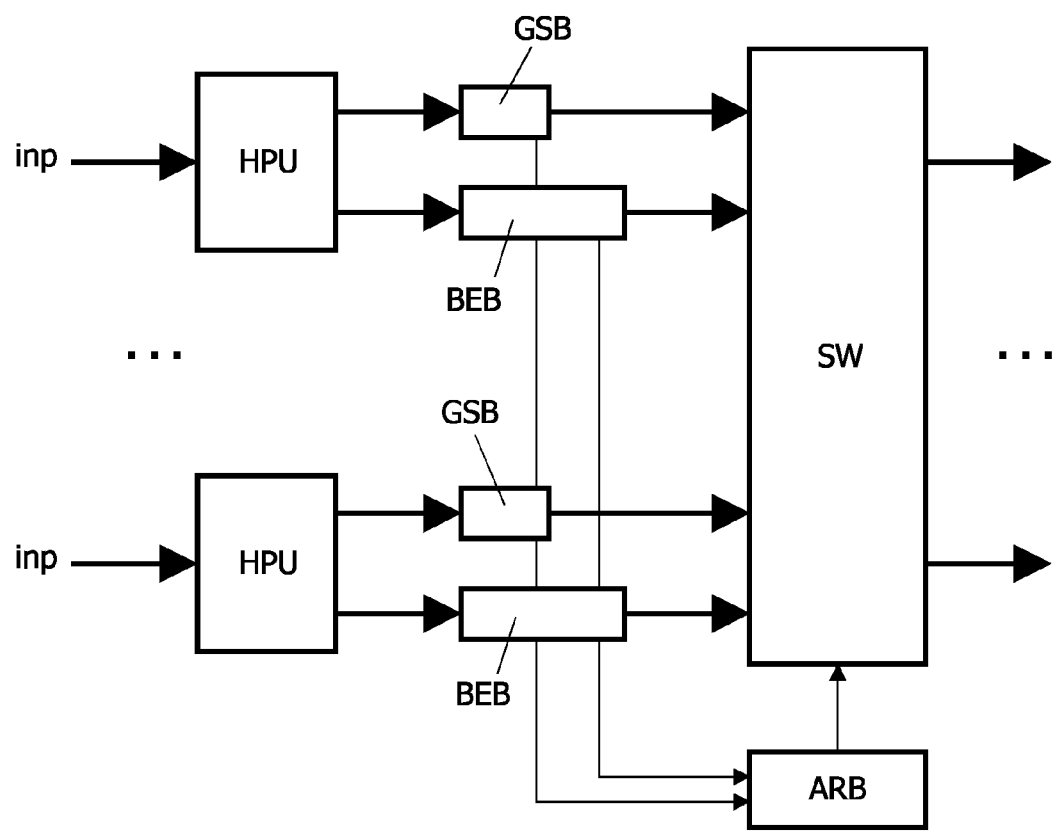
FIG. 9 shows a block diagram of a router according to the first embodiment.

FIG. 9 shows a block diagram of a router according to the first embodiment. Here, several input ports inp are shown, each with a header parsing unit HPU and its associated buffers GSB, BEB, which are connected to a switch. The router may furthermore comprise an arbiter ARB. The best effort buffers BEB and the GS buffers GSB are used as inputs to the switch SW of the router. Such an arrangement represents an input-queued router. Alternatively to a direct coupling of the buffers to the switch SW, the buffers may also be coupled to the switch via a multiplexer.

It should be noted that although the principles of the invention have been described with regard to a GS traffic and a BE traffic, more than these two traffic classes can be present. For example, more than one BE traffic class can be present. Such a situation can be implemented by merely extending the number of buffers associated to a header parsing unit HPU.

Although in the above, the queuing of data has been described with regard to buffers, also other queuing schemes may be possible. One example thereof can be the virtual output queuing by instantiating queues per pair of input/output ports. All of the queues of an input port can be grouped in a single memory. Output queuing can be implemented by allowing the data to be routed through a switch to an output port as separating the GS data from the BE data at the output port.

Figure 10:
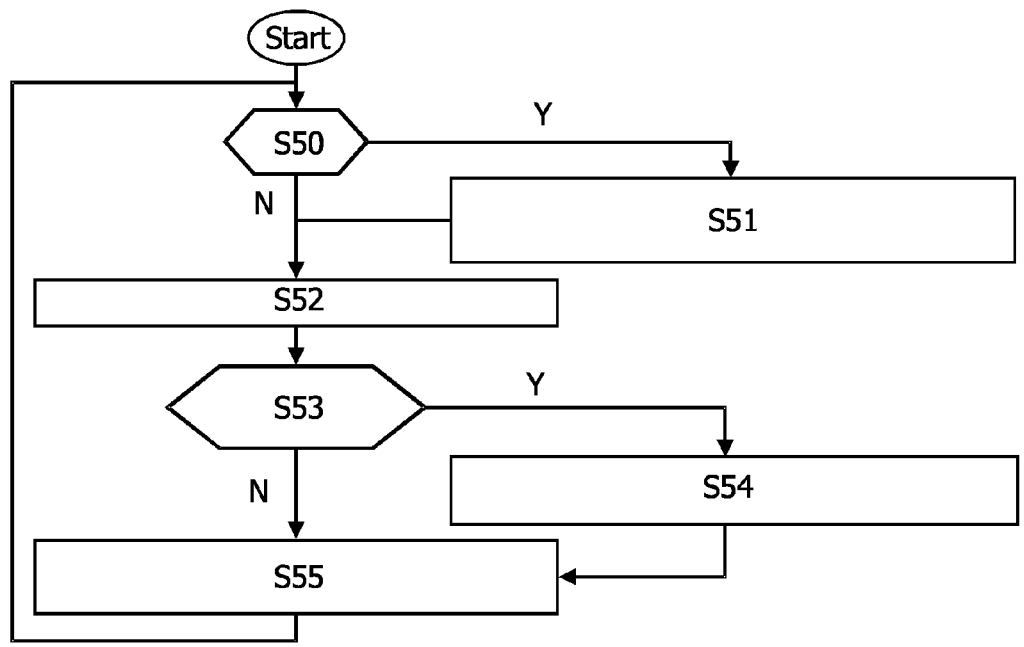
FIG. 10 shows a representation of a state machine of an arbiter according to FIG. 9.

FIG. 10 shows a representation of a state machine for an arbiter within the structure of FIG. 9. In step S50, it is determined whether a slot boundary is present. If a slot boundary is present, the slot reservations may change. For this reason, in step S51, the arbiter suspends the ongoing BE traffic for which the ports serve GS traffic. The arbiter also resumes the BE traffic for which ports have become unused. If the best effort traffic is stopped, the best effort packet state is saved such that the best effort traffic can be resumed later on. When a packet is resumed, an extra (redundant) header may be added to indicate packet continuation to make the protocol more robust and flexible. In step 52, the switch is set to serve the existing GS traffic for which the current slot has been reserved. In step S53, the transferring of the BE packets is continued as soon as both required input and output ports become available. This may occur when GS data requiring these slots have finished during the particular slot or when a new slot starts where the ports in question are not used anymore. At the boundaries of a BE packet, the packets from different input ports may require the same output ports. Therefore, an arbitration scheme is required to solve this kind of contention. The required arbitration scheme may be any scheme known from the prior art. Examples may be a round robin scheme, a weighted-round robin scheme, a priority-based scheme, a rate-based scheme or a deadline-based scheme.

Instead of being only active at any transfer of a micro packet μpck (at the beginning), the arbiter ARB needs to be active at the transfer of each word to detect a new BE packet pck. Although this will result in a higher power consumption for the arbitration, this extra power consumption is marginal as the state machine required for such an arbiter is very simple and does therefore require very little extra power. The actual power saving resulted from the improved utilization of the links will be larger than the power consumption induced by the amended arbiter. Accordingly, the overall system power will be reduced with an arbitration scheme described above.

The arbiter's state machine according to FIG. 10 is shown for the case in which the GS data is aligned to the beginning of the micro packet. As mentioned before, alternatives exist, including aligning the GS data at the end of the micro packet, or allowing the GS data at an arbitrary position in the micro packet.

Although the principles of the invention have been described above with regard to a network environment using serial links, the basic principles of the invention may also be applied to any slot-based network interconnect like on-chip interconnects, inter-chip interconnects, interconnects on a board or interconnects of a computer network. The basic principles of the invention are advantageous for such networks where the slots are to be enlarged for example to lower the power consumption while ensuring that the slots can be used more efficiently.

Figure 11:
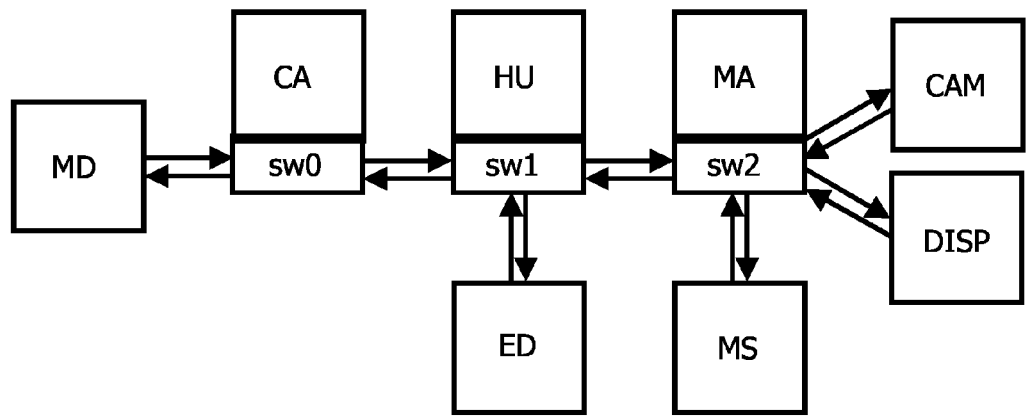
FIG. 11 shows a block diagram of an electronic device according to the second embodiment.

FIG. 11 shows a block diagram of an electronic device according to the second embodiment. The electronic device (like a mobile phone) comprises a modem MD, a computation accelerator CA, a host unit HU, a media accelerator MA, a camera CAM, a display DISP, a mass storage MS and possibly an external device ED. The computation accelerator CA, the host HU and the media accelerator are each merged in the same chip with a switch (SW0, SW1, SW2, respectively). The switch may be embodied as described according to FIG. 7 or FIG. 9. The structure of the communication within the electronic device according to FIG. 11 corresponds substantially to the communication according to the first embodiment. In particular, the data is transferred among the different units of the electronic device based on packets pck. The data is transferred during time slots, wherein the amount of data transferred during one time slot corresponds to a micro packet μpck as described according to the first embodiment. The packets pck and the micro packets μpck correspond to the packets pck and the micro packets μpck according to the first embodiment. Accordingly, several best effort packets pck1-pck3 can be transferred within a single micro packet μpck.

The above described time slot allocation can be applied to any data processing device comprising several separated integrated circuits or multi-chip networks, as well as to a network on a single chip.

The methods described herein can be applied also to different communication resource reservation schemes such as rate-based (rate-controlled) or deadline-based schemes, implemented with e.g. input, output, input-output, and/or virtual circuit/channel buffering schemes.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. An electronic device, comprising:
an interconnect means (N, sw0-sw2) for connecting a plurality of modules (IP); and
at least one network interface (NI) for coupling at least one of the plurality of modules (IP) to the interconnect means (N; sw0-sw2) and for packetizing data from the modules (IP) into first packets (pck);
wherein the communication over the interconnect (N; sw0-sw2) is based on time slots, wherein a second packet (μpck) is transferred during one time slot;
wherein a data traffic over the interconnect means (N; sw0-sw2) comprises at least one guaranteed service traffic class (GS) and/or at least one best-effort service traffic class (BE);
wherein first packets (GSpck) relating to the at least one guaranteed service traffic class (GS) are transferred in second packets (μpck) within time slots reserved for the guaranteed service traffic class (GS);
wherein first packets (pck1-pck6) relating to the at least one best-effort service traffic class (BE) are transferred within unreserved second packets (μpck) and/or within unused portions (uu) of the second packets (μpck) and wherein an extra header is introduced to a first packet (pck1-pck6) relating to the at least one best-effort service traffic class (BE), if not all of the first packets (pck1-pck6) are transferred within one second packet (μpck).

2. The electronic device according to claim 1, wherein the first packets (GSpck) relating to the at least one guaranteed service traffic class (GS) are aligned to a beginning or an end of a second packet (μpck).

3. The electronic device according to claim 1, wherein the interconnect means (N, sw0-sw2) comprises at least one router (R) for routing the second packets (μpck) through the interconnect means (N, sw0-sw2),
wherein at least one router (R) and the at least one network interface (NI) are coupled providing links;
wherein the second packets (μpck) form link-level data units.

4. The electronic device according to claim 3, further comprising
at least one header parsing unit (HPU) for parsing the second packets (μpck), wherein the header parsing unit (HPU) is active for every word of the second packets (μpck).

5. The electronic device according to claim 4, wherein a header parsing unit (HPU) is associated to each link.

6. A mobile device comprising
an interconnect means (N, sw0-sw2) for connecting a plurality of modules (IP);
at least one network interface (NI) for coupling at least one of the plurality of modules (IP) to the interconnect means (N; sw0-sw2) and for packetizing data from the modules (IP) into first packets (pck);
wherein the communication over the interconnect (N; sw0-sw2) is based on time slots, wherein a second packet (μpck) is transferred during one time slot;
wherein a data traffic over the interconnect means (N; sw0-sw2) comprises at least one guaranteed service traffic class (GS) and/or at least one best-effort service traffic class (BE);
wherein first packets (GSpck) relating to the at least one guaranteed service traffic class (GS) are transferred in second packets (μpck) within time slots reserved for the guaranteed service traffic class (GS);
wherein first packets (pck1-pck6) relating to the at least one best-effort service traffic class (BE) are transferred within unreserved second packets (μpck) and/or within unused portions (uu) of the second packets (μpck) and wherein an extra header is introduced to a first packet (pck1-pck6) relating to the at least one best-effort service traffic class (BE), if not all of the first packets (pck1-pck6) are transferred within one second packet (μpck).

7. A method of communication resource allocation within an electronic device having an interconnect means (N, sw0-sw2) for connecting a plurality of modules (IP); and at least one network interface (NI) for coupling at least one of the plurality of modules (IP) to the interconnect means (N; sw0-sw2) and for packetizing data from the modules (IP) into first packets (pck), wherein a data traffic over the interconnect means (N; sw0-sw2) comprises at least one guaranteed service traffic class (GS) and/or at least one best-effort service traffic class (BE), comprising the steps of:

communicating over the interconnect (N; sw0-sw2) based on time slots, wherein a second packet (μpck) is transferred during one time slot;

transferring first packets (GSpck) relating to the at least one guaranteed service traffic class (GS) in second packets (μpck) within time slots reserved for the guaranteed service traffic class (GS); and transferring first packets (pck1-pck6) relating to the at least one best-effort service traffic class (BE) within unreserved second packets (μpck) and/or within unused portions (uu) of the second packets (μpck), wherein an extra header is introduced to a first packet (pck1-pck6) relating to the at least one best-effort service traffic class (BE), if not all of the first packets (pck1-pck6) are transferred within one second packet (μpck).

8. A data processing system, comprising:

an interconnect means (N, sw0-sw2) for connecting a plurality of modules (IP);

at least one network interface (NI) for coupling at least one of the plurality of modules (IP) to the interconnect means (N; sw0-sw2) and for packetizing data from the modules (IP) into first packets (pck);

wherein the communication over the interconnect (N; sw0-sw2) is based on time slots, wherein a second packet (μpck) is transferred during one time slot;

wherein a data traffic over the interconnect means (N; sw0-sw2) comprises at least one guaranteed service traffic class (GS) and/or at least one best-effort service traffic class (BE);

wherein first packets (GSpck) relating to the at least one guaranteed service traffic class (GS) are transferred in second packets (μpck) within time slots reserved for the guaranteed service traffic class (GS);

wherein first packets (pck1-pck6) relating to the at least one best-effort service traffic class (BE) are transferred within unreserved second packets (μpck) and/or within unused portions (uu) of the second packets (μpck) and wherein an extra header is introduced to a first packet (pck1-pck6) relating to the at least one best-effort service traffic class (BE), if not all of the first packets (pck1-pck6) are transferred within one second packet (μpck).

* * * * *